US009417394B2

(12) United States Patent
Magnusson

(10) Patent No.: US 9,417,394 B2
(45) Date of Patent: Aug. 16, 2016

(54) SPECTRALLY DENSE COMB-LIKE FILTERS FASHIONED WITH THICK-GUIDED-MODE RESONANT GRATINGS

(71) Applicant: The University of Texas System Board of Regents, Austin, TX (US)

(72) Inventor: Robert Magnusson, Arlington, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 260 days.

(21) Appl. No.: 13/962,676

(22) Filed: Aug. 8, 2013

(65) Prior Publication Data

US 2014/0044393 A1 Feb. 13, 2014

Related U.S. Application Data

(60) Provisional application No. 61/680,953, filed on Aug. 8, 2012.

(51) Int. Cl.
| | |
|---|---|
| *G02B 1/10* | (2015.01) |
| *G02B 5/28* | (2006.01) |
| *G02B 5/08* | (2006.01) |
| *G02B 5/20* | (2006.01) |
| *F21V 9/04* | (2006.01) |
| *F21V 9/06* | (2006.01) |
| *G02B 6/34* | (2006.01) |

(Continued)

(52) U.S. Cl.
CPC ............... *G02B 6/34* (2013.01); *G02B 5/1809* (2013.01); *G02B 5/203* (2013.01); *G02B 6/29329* (2013.01)

(58) Field of Classification Search
CPC .. G02B 6/34; G02B 6/29329; G02B 6/02057; G02B 6/1225; G02B 6/132; G02B 6/29316; G02B 5/1809; G02B 5/203; G02B 5/1866; G02B 5/288; G02B 5/285; G02B 5/18; G02B 5/008; G02B 5/0833; G02B 5/1885; G02B 6/0035; G02B 6/0038; G02B 6/0076; G02B 6/0058; G02B 6/0229; G02B 6/02347; G02B 1/005; G02B 2207/101; G02B 6/0065; G02F 2201/302; G02F 2201/305; G02F 2203/055; G02F 2203/15
USPC .............. 359/344, 566, 569, 584; 385/10, 37, 385/122, 131
See application file for complete search history.

(56) References Cited

U.S. PATENT DOCUMENTS

| | | | |
|---|---|---|---|
| 5,216,680 A | 6/1993 | Magnusson | ..................... 372/20 |
| 5,598,300 A * | 1/1997 | Magnusson et al. | .......... 359/566 |
| 5,998,298 A * | 12/1999 | Fleming et al. | ............... 438/692 |

(Continued)

OTHER PUBLICATIONS

Avrutsky & Sychugov, *J Mod Opt*. 36:1527-39, 1989.

(Continued)

*Primary Examiner* — Bumsuk Won
*Assistant Examiner* — Collin X Beatty
(74) *Attorney, Agent, or Firm* — Norton Rose Fulbright US LLP

(57) ABSTRACT

An apparatus, system, and method for spectrally dense comb-like filters fashioned with thick-guided-mode resonant gratings. A guided-mode resonance (GMR) filter has a film having a thickness many times larger than a wavelength of operation and the film has a first surface and a second surface opposite to the first surface. The GMR filter further has a periodic pattern on the first surface of the film and an antireflection layer on the second surface of the film.

20 Claims, 14 Drawing Sheets

(51) Int. Cl.
*G02B 5/18* (2006.01)
*G02B 6/293* (2006.01)

(56) References Cited

U.S. PATENT DOCUMENTS

| | | | | |
|---|---|---|---|---|
| 6,035,089 | A * | 3/2000 | Grann et al. | 385/129 |
| 6,154,480 | A | 11/2000 | Magnusson | 372/96 |
| 6,212,312 | B1 * | 4/2001 | Grann | G02B 5/1861 385/24 |
| 6,215,928 | B1 * | 4/2001 | Friesem et al. | 385/37 |
| 7,167,615 | B1 | 1/2007 | Wawro et al. | 385/37 |
| 7,190,859 | B2 | 3/2007 | Greiner et al. | 385/37 |
| 7,218,817 | B2 * | 5/2007 | Magnusson et al. | 385/37 |
| 7,400,399 | B2 | 7/2008 | Wawro et al. | 356/328 |
| 7,689,086 | B2 | 3/2010 | Magnusson | 385/129 |
| 8,273,997 | B2 * | 9/2012 | Delfeld et al. | 174/350 |
| 8,369,665 | B2 * | 2/2013 | Fattal et al. | 385/37 |
| 8,514,391 | B2 | 8/2013 | Wawro | 356/300 |
| 2003/0133485 | A1 * | 7/2003 | Liu | H01S 5/026 372/50.121 |
| 2005/0025422 | A1 | 2/2005 | Magnusson | 385/37 |
| 2005/0100060 | A1 * | 5/2005 | Liu | H01S 3/0635 372/6 |
| 2006/0040376 | A1 * | 2/2006 | Cunningham et al. | 435/287.1 |
| 2006/0193550 | A1 * | 8/2006 | Wawro et al. | 385/12 |
| 2007/0071061 | A1 * | 3/2007 | Pietra et al. | 372/102 |
| 2009/0116790 | A1 * | 5/2009 | Mossberg et al. | 385/37 |
| 2011/0156987 | A1 * | 6/2011 | Magnusson | G02B 5/0833 343/912 |
| 2011/0267611 | A1 * | 11/2011 | Li et al. | 356/301 |
| 2013/0301988 | A1 * | 11/2013 | Monmayrant et al. | 385/37 |

OTHER PUBLICATIONS

Boonruang, et al., *Appl Opt*. 45(22):5740-7, 2006.
Ding & Magnusson, *Opt Express*. 12(9):1885-91, 2004.
Ding & Magnusson, *Opt Express*. 12:5661-74, 2004.
Eberhart & Kennedy, *Proc IEEE, Neural Network*, Australia: 1942-8, 1995.
Wang & Magnusson, *Appl Opt*. 32:2606-13, 1993.
Golubenko, et al., *Sov J Quantum Eletron*. 15:886-7, 1985.
Greenwell, et al., *Appl Opt*. 46(25):6355-61, 2007.
Liu & Magnusson, *IEEE Photonics Technol Lett*. 14:1091-3, 2002.
Magnusson & Wang, *Appl Phys Lett*. 61:1022-4, 1992.
Magnusson, et al., *Proc SPIE*. 8102:810202-1-810202-12, 2011.
Magnusson, Shokooh-Saremi & Wang, *Optics Express*. 18(1):108-116, 2010.
Mashey & Popov, *Opt Comm*. 55:377-380, 1985.
Moharam, et al., *J Opt Soc Am A*. 12(5):1077-86, 1995.
Peng, et al., *IEEE Trans Microwave Therory tech*. 23:123-33, 1975.
Schreier, et al., *Optics Letters*. 23(17):1337-1339, 1998.
Shokooh-Saremi & Magnusson, *Opt Lett*. 32:894-6, 2007.
Stockman, *Opt Express*. 19(22):22029-106, 2011.
Vincent & Neviere, *Appl. Phys*. 20:345-351, 1979.

* cited by examiner

SPECTRALLY DENSE COMB-LIKE FILTERS FASHIONED WITH THICK-GUIDED-MODE RESONANT GRATINGS

PRIORITY

This application claims priority to U.S. Provisional Patent Application 61/680,953 entitled "Spectrally Dense Comb-Like Filters Fashioned With Thick-Guided-Mode Resonant Gratings," and filed on Aug. 8, 2012, the entire contents of which are incorporated herein by reference without disclaimer.

STATEMENT REGARDING FEDERALLY-SPONSORED RESEARCH

This invention was made with government support under Agreement Number FA9550-10-1-0543 awarded by the United States Air Force Office of Scientific Research. The government has certain rights in the invention.

BACKGROUND OF THE INVENTION

1. Field of the Invention

This invention pertains to a new class of optical devices based on resonant leaky modes in periodically modulated structures. It is based on dielectric and semiconductor structures that are relatively thick, which can support a large number of quasi-guided or leaky, resonant modes. Embodiments disclosed herein include filters with comb-like spectral characteristics with a large number of spectral resonance peaks that may be useful in applications such as telecommunications.

2. Description of the Related Art

There is increasing worldwide interest in guided-mode resonance (GMR) effects that originate in quasi-guided, or leaky, waveguide modes induced on patterned films with subwavelength periods. Nanopatterned resonant elements yield versatile spectra with a rich variety of possible surface-localized photonic states. It has been shown that a single periodic resonance layer with one-dimensional (1D) periodicity enables narrow-line bandpass and bandstop filters, polarizers, reflectors, and polarization-independent elements. Numerous applications including laser mirrors, ultrasensitive biosensors, absorption enhancement in solar cells, security devices, tunable filters, nanoelectromechanical display pixels, leaky-mode nanoplasmonics, and others have been suggested. In this application, we present resonant mode multiline comb-like filters and numerical results indicating the effectiveness and potential use of such filters.

Much past research on GMR devices has focused on thin periodic layers supporting only a single leaky mode and associated resonance within a specified spectral band. In contrast, Liu and Magnusson explored properties of multiorder multimode GMR elements to design wideband and multiwavelength filters. Subsequently, Boonruang et al. designed multiline GMR filters using two-dimensional (2D) grating structures with rectangular and hexagonal grids. They implemented spectral location control by inducing leaky modes into specific directions on these grids. Greenwell et al. designed 1D multiwavelength GMR filters based on multimode waveguides with particular emphasis on resonance separation control.

SUMMARY OF THE INVENTION

A guided-mode resonance (GMR) filter is presented. The GMR filter may include a film having a thickness many times larger than a wavelength of operation and the film may have a first surface and a second surface opposite to the first surface. The GMR filter may have a periodic pattern on the first surface of the film and an antireflection layer on the second surface of the film.

In some embodiments, the wavelength of operation is in the telecommunications C band. In some embodiments, the thickness of the film may be between about 5 µm and 1500 µm. In some embodiments, the thickness of the film may be between about 100 µm and 500 µm.

In some embodiments, the periodic pattern may have a period sufficiently small such that diffraction orders outside the device are cut off. Furthermore, in some embodiments, the filter may be configured to reflect light as a comb-like filter. In some embodiments, the comb-like filter may be configured to be fitted to an ITU grid.

In some embodiments, the periodic pattern is in an antireflective layer coupled to the film. In some embodiments, the periodic pattern may be inscribed in the film. In some embodiments, the filter may also include a second periodic layer on the second surface of the film. In some embodiments, the periodic pattern may be orthogonal to the second periodic layer. In addition, in some embodiments, the periodic pattern may exhibit one-dimensional periodicity or two-dimensional periodicity. Furthermore, the periodic layer may have a profile selected from a group consisting of a binary profile, rectangular profile, trapezoidal profile, sinusoidal profile, triangular profile, and combinations thereof.

In some embodiments, the film may include a dielectric. In some embodiments, the film may include a semiconductor.

A method for filtering light is also presented. The method in the disclosed embodiments substantially includes the steps necessary to carry out the functions presented above with respect to the operation of the described apparatus and system. In some embodiments, the method may include receiving, at a first surface of a guided-mode resonant filter, incident light. The method may also include causing the incident light to be filtered in a periodic comb-like fashion.

A method for making a guided mode resonant filter is also presented. In some embodiments, the method includes providing a film having a thickness many times larger than a wavelength of operation. In some embodiments, the film may be a semiconductor, such as a silicon wafer. The film may have a first surface and a second surface opposite to the first surface. In some embodiments, the method may include disposing a periodic pattern on the first surface of the film. Disposing the periodic pattern may be performed by etching, or inscribing, the periodic layer into the film. In some embodiments, the method may include disposing an antireflection layer on the second surface of the film. Disposing the antireflection layer onto the second surface of the film may be accomplished by standard thin-film deposition processes.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 7A shows the dielectric structure with design parameters. FIG. 7B shows a GMR comb-like reflectance spectrum and ITU wavelengths denoted by a vertical dashed line.

FIG. 8A shows the semiconductor (silicon) structure with design parameters used. FIG. 8B shows the GMR comb-like reflectance spectrum and ITU wavelengths denoted by a vertical dashed line.

FIG. 12A shows experimental $T_0$ results. FIG. 12B shows computed results using the experimental parameters.

DETAILED DESCRIPTION

Various features and advantageous details are explained more fully with reference to the nonlimiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Comb-type filters based on resonant leaky modes in periodically modulated films are provided by the present disclosure. We present the spectral properties of multiline guided-mode resonance filters designed with extremely thick dielectric films. In some embodiments disclosed herein, we treat a dielectric membrane in air with a subwavelength grating inscribed into one surface. As the film may be very thick (relative to the wavelength of the incident light), it may support a large number of resonant modes. In general, the resonant modes yield a dense reflectance spectrum with an irregular appearance. By placing an antireflection layer on the backside of the dielectric slab, the interference between the directly-transmitted zero order and the diffracted order generating the waveguide modes may be reduced or eliminated. Thus, a well-shaped unperturbed comb-like spectrum may be realized. In one embodiment, a titanium dioxide membrane that is 500 µm thick generates a spectrum with more than 1000 channels separated by ~0.8 nm near the 1.55 µm wavelength. Reference is made to a number of exemplary illustrative implementations described in detail below.

Figure 1:
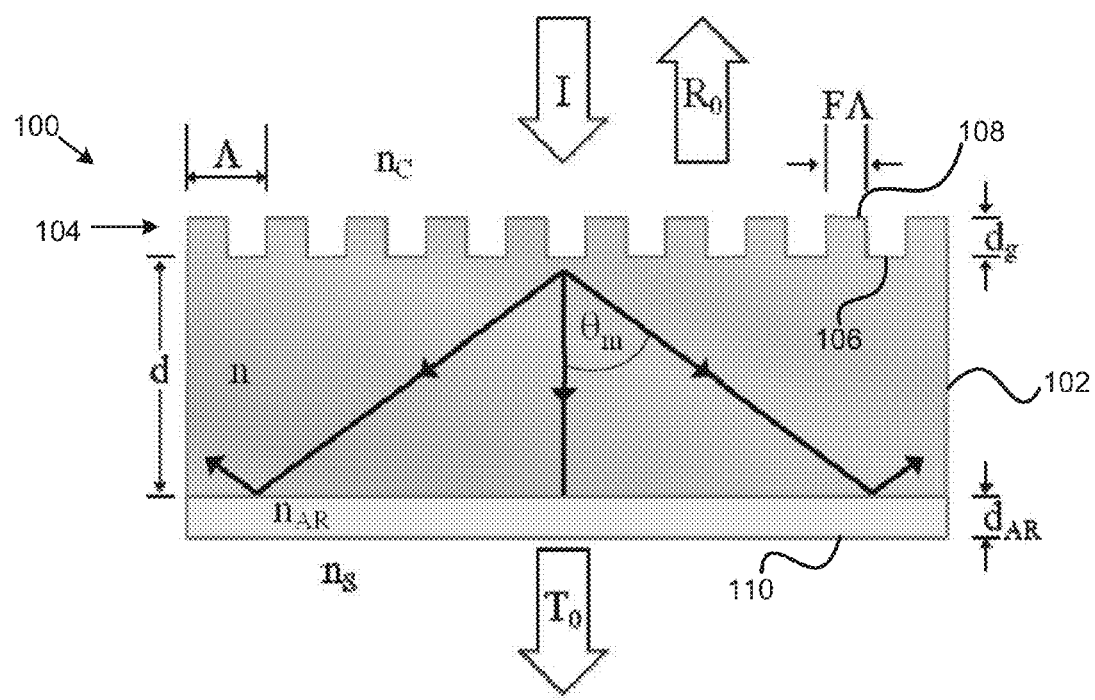
FIG. 1 is a model of a guided-mode resonant grating denoting thicknesses (d) of the layers and refractive indices (n) of the various regions as well as the period ($\Lambda$) and fill factor (F) of the grating. In particular, we consider a thick dielectric slab with a periodic boundary illuminated at normal incidence as shown. The period is sufficiently small such that only the zero-order transmitted ($T_0$) and reflected ($R_0$) waves propagate. An antireflection (AR) layer is placed on the bottom surface.

FIG. 1 shows a guide mode resonant filter 100. The filter 100 includes a film, or dielectric slab, 102 that has a thickness "d". FIG. 1 is not drawn to scale. The thickness d is large compared to the wavelength of operation (i.e. wavelength of light to be filtered by the filter 100). In some embodiments, the thickness d may range between about three times the wavelength of operation to about 1000 times the wavelength of operation. For example, when used with the C-band of telecommunications (light having a wavelength of about 1.554 µm), the thickness d may be between about 5 µm to about 1.5 millimeters. Preferably, in some embodiments, the film has a thickness between about 100 µm and 500 µm. The film has a periodic pattern 104 on a first surface. In some embodiments, the periodic pattern 104 may be inscribed in the film, while in others the periodic pattern 104 may be part of a separate material coupled to the film 102. The period ($\Lambda$) of the periodic pattern 104 can be, by design, divided into multiple different parts. For example, in FIG. 1, it is shown that the period is divided into two parts—the fill (or filling or ridge) 108 (fraction of period occupied by a particular material denoted by F$\Lambda$) and the groove 106. The groove 106 depth is denoted as $d_g$, and is the different between the highest point of the fill or ridge 108 and the lowest point of the groove 106. On the second surface of the film 102 is an antireflective layer 110 which has a thickness denoted by $d_{AR}$.

In FIG. 1, there are four different indices of refraction: 1) $n_C$, which is the index of refraction of the medium above the periodic pattern 104 (cover medium), 2) n, which is the index of refraction of the film 102, 3) $n_{AR}$, which is the index of refraction of the antireflective layer 110, and 4) $n_S$, which is the index of refraction of the medium below the antireflective layer (substrate medium). The dimensions of the periodic pattern 104, film 102, and the antireflective layer 110, along with their respective indexes of refraction, affect how the guided mode resonant filter 100 responds to light.

An incident light wave "I" is directed at the filter 100. The zero-order reflectance of I is denoted as "$R_0$," and the zero-order transmittance as "$T_0$". The angle of incidence of light I, generally denoted as θ, may be set to zero (i.e. normal incidence; this is the case shown in FIG. 1). However, the incident wave can be directed at the structure at any angle, θ. In addition, the incident wave can have any polarization: transverse electric (TE), transverse magnetic (TM), random polarization or unpolarized. When the electric field vector is normal to the plane of incidence, the polarization is known as TE; when the magnetic field is thus directed, the polarization is known as TM. If the period of the structure is smaller than the incident wavelength, the subwavelength regime prevails; hence only the zero-order diffraction orders are propagating and the higher orders will be evanescent. The first-order or higher-order evanescent diffraction waves generated by the patterned layers induce resonances by being coupled to leaky modes. Thus the very thick structures disclosed here containing waveguide layers and periodic elements can exhibit the guided-mode resonance (GMR) effect (also called the leaky-mode resonance effect) under proper phase-matching conditions.

To find the optimal structural parameters of any GMR element with desired spectral response, one can employ various types of mathematical tools such as analysis/simulation and design/optimization tools. In the case of analysis and simulation of the proposed structures, one may numerically solve fundamental electromagnetics equations with the proper boundary conditions. These numerical results, which can provide the efficiencies of the diffraction orders and associated phases and also quantitative electromagnetic field distributions, may be obtained by utilizing rigorous coupled-wave analysis (RCWA) and modal analysis. These methods also provide computational kernels in the design process when using inverse numerical design approaches. The filters disclosed herein have been designed and verified using such mathematical methods.

Some of the examples below apply inverse methods to fit the resonance lines onto a prescribed grid of wavelengths. For this, one may use an evolutionary technique known as particle swarm optimization ("PSO"). Although there are several well-known methods for analysis of diffraction gratings, design of these elements with strictly specified spectral properties is generally a challenging problem. Here, "spectra" refer to the wavelength or frequency spectra as well as to angular spectra. Design and synthesis techniques based on evolutionary strategies (mainly genetic algorithms) have found applications in this area. Particle swarm optimization (PSO) is a robust, stochastic evolutionary strategy that has been recently utilized in electromagnetic design problems. This method is inspired from social behavior of animal species like birds, bees, and others ("particles"), looking for their requirements in the search area. The algorithm finds the optimal solution by moving the particles in the search space. PSO lets every individual within the swarm move from a given point to a new one with a velocity based on a weighted combination of the individual's current velocity, best position ever found by that individual, and the group's best position. Associated with this method is an algorithm referred to as standard, real-coded PSO, which was used to develop the filters disclosed herein.

Thus, in accordance with a preferred aspect of the present disclosure, with certain material systems currently available, one may design comb-like GMR filters with desired linewidths, sideband levels, and individual spectral positions. One may also find the proper structural parameters for fabrication of these devices such as demonstrated by the following examples.

For clarity and expediency, the following examples are limited to normal incidence (that is θ=0 relative the device normal) and transverse-electric (TE) polarization. However, other angles of incidence and other polarizations may be used with the filters disclosed herein. Furthermore, in these examples, the refractive index of the film 102 is n=2.5, which corresponds to the refractive index of titanium dioxide. In general, all the parameters of the device may be modified based on availability of materials and fabrication resources.

The $m^{th}$ diffraction order indicated in FIG. 1 propagating at angle $θ_m$ excites a leaky waveguide mode at a particular wavelength. Under variation of the wavelength, the allowed modes will be sequentially excited with a guided-mode resonance arising for each mode. The mode angle satisfies $\sin θ_m = mλ/Λn$ with λ being the free-space wavelength, Λ the period, and n the refractive index of the waveguide. Initially, we choose the device parameters such that m=±1 are the only diffraction orders existing in the waveguide.

Figure 2:
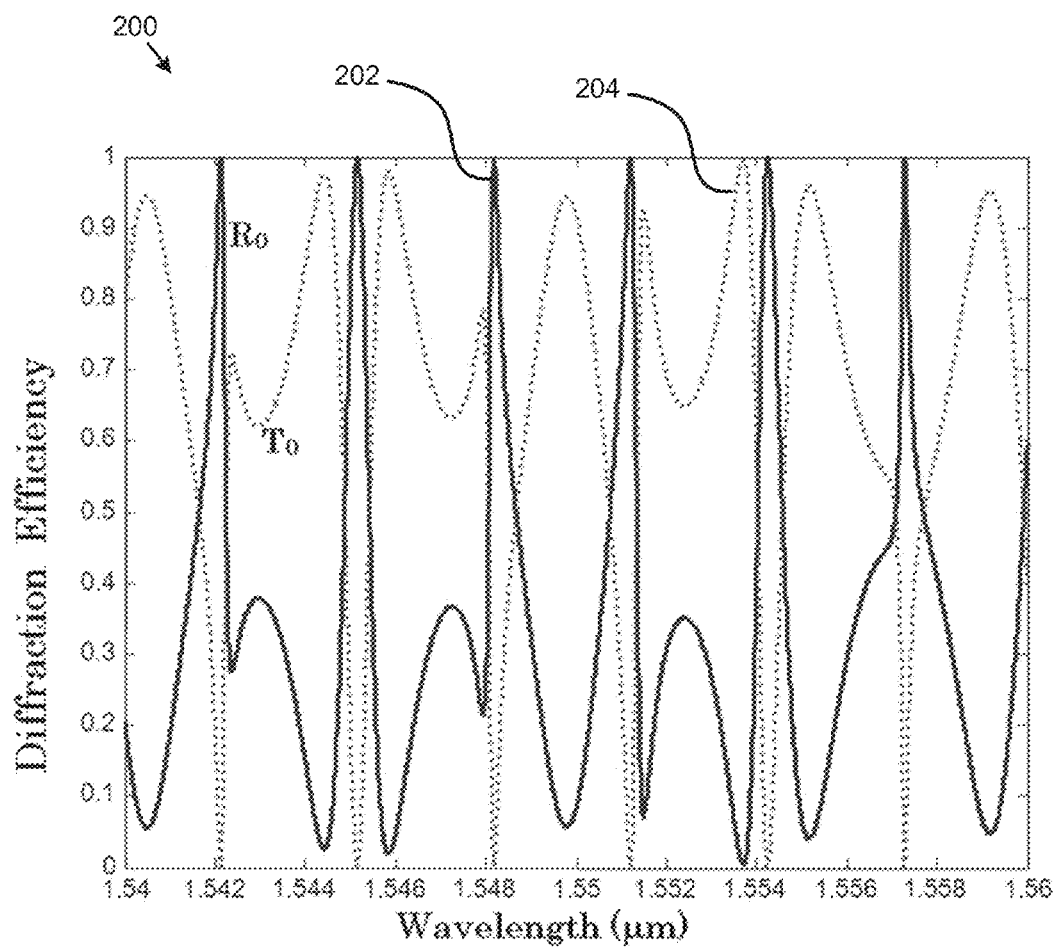
FIG. 2 is the calculated spectral response of the designed GMR filter for TE-polarized incident light. Parameters: $d_g$=500 nm, d=100 µm, $d_{AR}$=0, n=2.5 $n_c$=1.00, $n_s$=1.00; grating period $\Lambda$=800 nm; fill factor F=0.5.

FIG. 2 shows a graph 200 of the zero-order reflectance $R_0$ 202 and transmittance $T_0$ 204 of a 100-μm-thick dielectric membrane in air in the C-band of the telecommunications spectrum. Whereas multiple high-efficiency reflectance peaks appear in the spectrum, they have irregular shapes. The design parameters are, in this example, as follows: $d_g$=500 nm, d=100 μm, $d_{AR}$=0, n=2.5 $n_c$=1.00, $n_s$=1.00; grating period Λ=800 nm; fill factor F=0.5.

Figure 3:
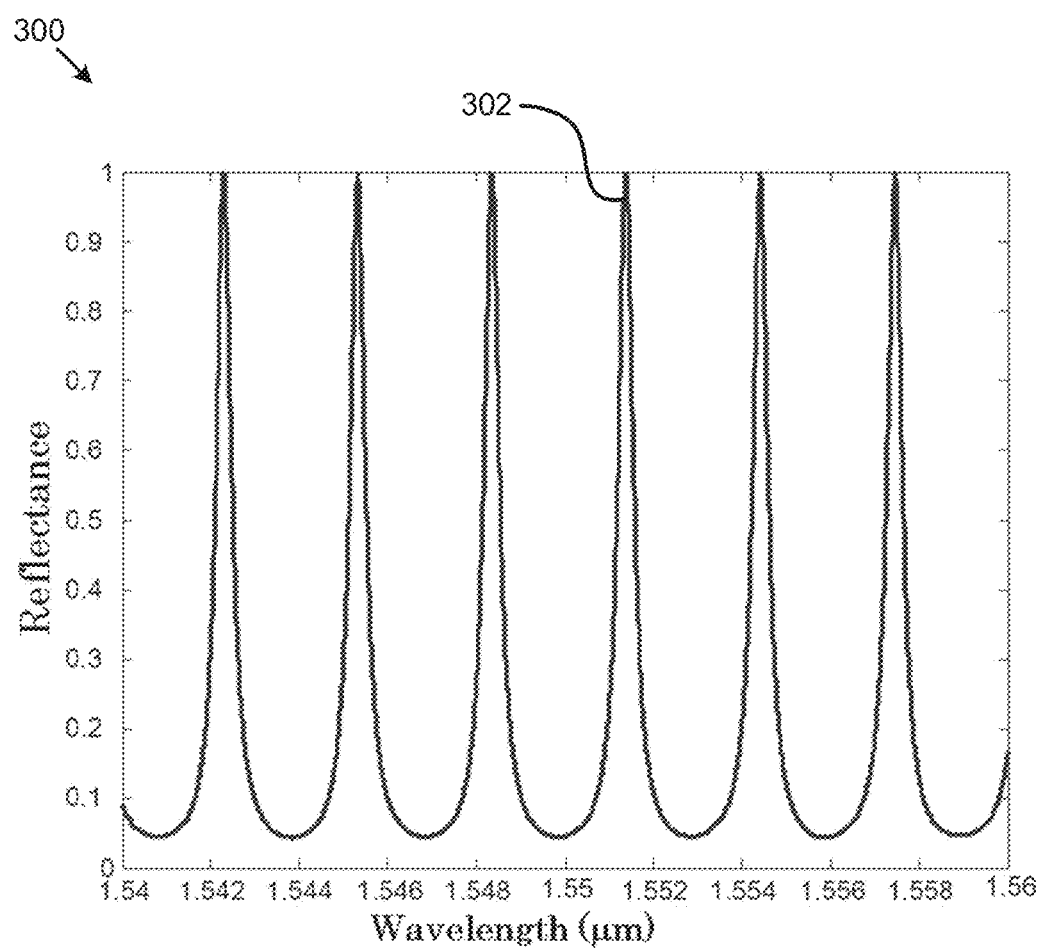
FIG. 3 is the calculated reflectance spectrum with an added quarter-wave AR layer with $d_{AR}$=245 nm and $n_{AR}$=1.581. Other parameters are the same as in FIG. 2.

Placing a quarter-wave antireflection (AR) layer 110 centered at λ=1.55 μm on the device as shown in FIG. 1 eliminates interference from the directly-transmitted wave and renders a well-shaped reflectance spectrum 300 as shown in FIG. 3. The full-width at half-maximum (FWHM) of each resonance peak 302 is ~0.4 nm. For the parameters used to create FIG. 3, the diffraction angle of the first diffraction order is $θ_1$=50.8° at λ=1.55 μm. The critical angle at the $n/n_{AR}$ refractive-index interface is 39.23°; hence total internal reflection (TIR) occurs at that interface. The calculated reflectance spectrum 300, in this example, pertains to the case with an added quarter-wave AR layer with $d_{AR}$=245 nm and $n_{AR}$=1.581. Other device parameters are the same as those disclosed in connection with FIG. 2. The computations used to create the spectra of FIGS. 2-3 were performed using rigorous coupled-wave analysis (RCWA).

Figure 4:
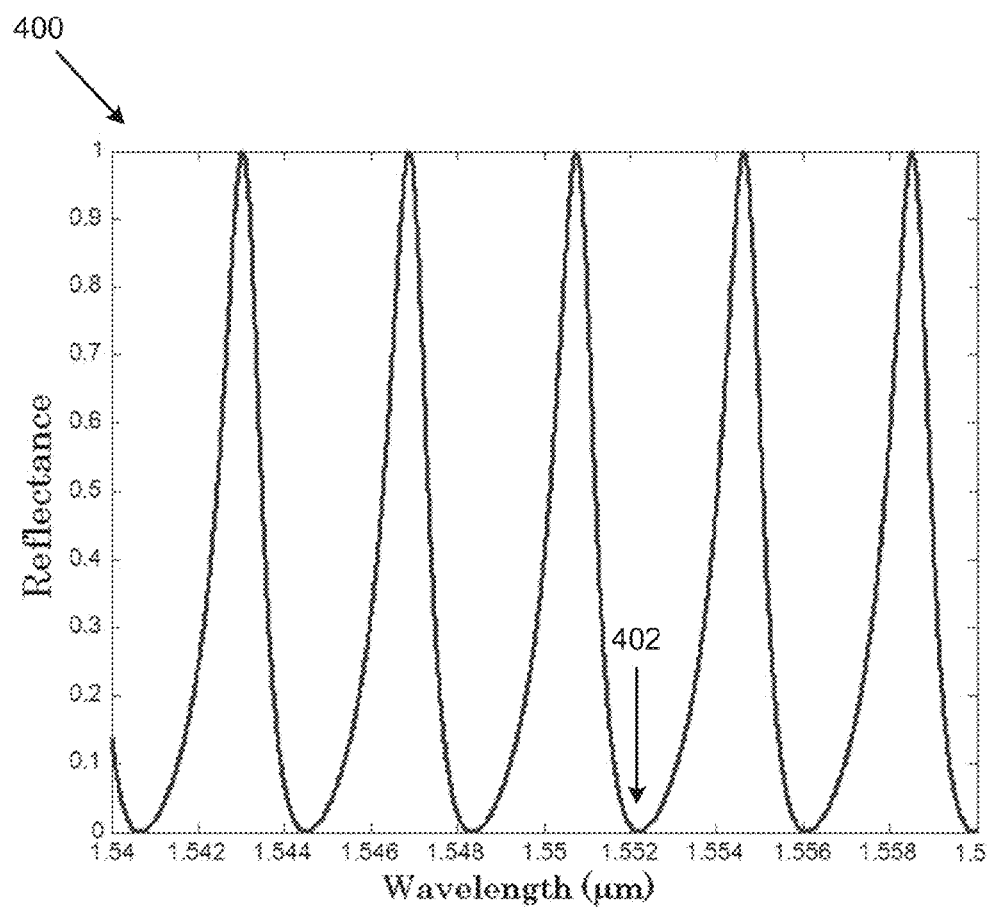
FIG. 4 is the same as FIG. 3 but with $\Lambda$=1050 nm.

By varying the device parameters, the sidebands can be lowered. For example, changing the period to Λ=1050 nm yields the spectra 400 shown in FIG. 4 with sidebands 402 at zero. Since the critical period for TIR to take place at the $n/n_{AR}$ interface is $Λ=/n_{AR}$=980 nm at λ=1.55 μm, TIR now occurs at the $n_{AR}/n_s$ interface. Here, the term "critical period" refers to the largest value of the period for which TIR occurs at the interface between the space with refractive index n and that with index $n_{AR}$. Thus, with light entering the AR layer, there is a reflection from both the $n/n_{AR}$ interface and the $n_{AR}/n_s$ interface. Interference between these reflected fields acts to modulate the spectra and can thereby affect the sideband levels. The device parameters used to create the spectra 400 are the same as those for FIG. 3 but with Λ=1050 nm.

Figure 5A:
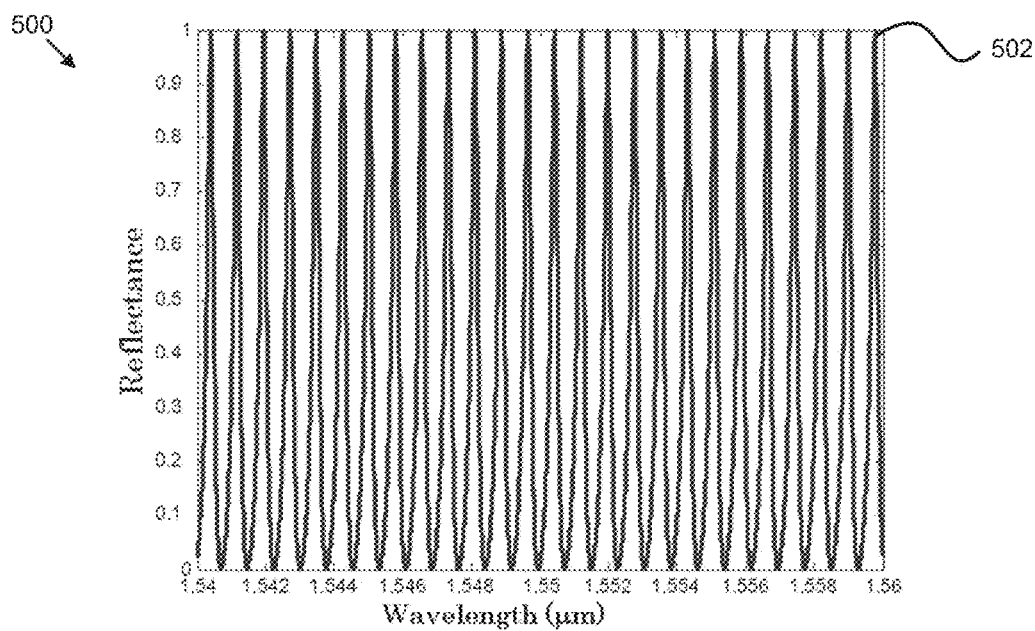
FIG. 5A is the same as FIG. 4 but with d=500 µm.

As the spectral density of the GMR peaks is controlled by the thickness d in large measure, one may compute the spectrum for a larger value. Letting d=500 μm, for example, places ~26 resonance peaks 502 in the 1.54-1.56 μm spectral band as shown in FIG. 5A. Each resonance peak has FWHM spectral width of ~0.2 nm and channel spacing of ~0.8 nm. Using the approximate formula for the number of modes ("M") supported by a homogeneous dielectric waveguide $M \sim (2d/\lambda)(n^2-n_c^2)^{1/2}$, we find M~1480 for this case. The parameters for the device of FIG. 5A are the same as those for FIG. 4 but with d=500 μm. Hence, most of the resonance peaks arise outside the narrow spectral range chosen for FIG. 5A while retaining similar spectral characteristics. For lossy media, the resonance reflectance will be reduced in proportion to the imaginary part of the refractive index.

Figure 5B:
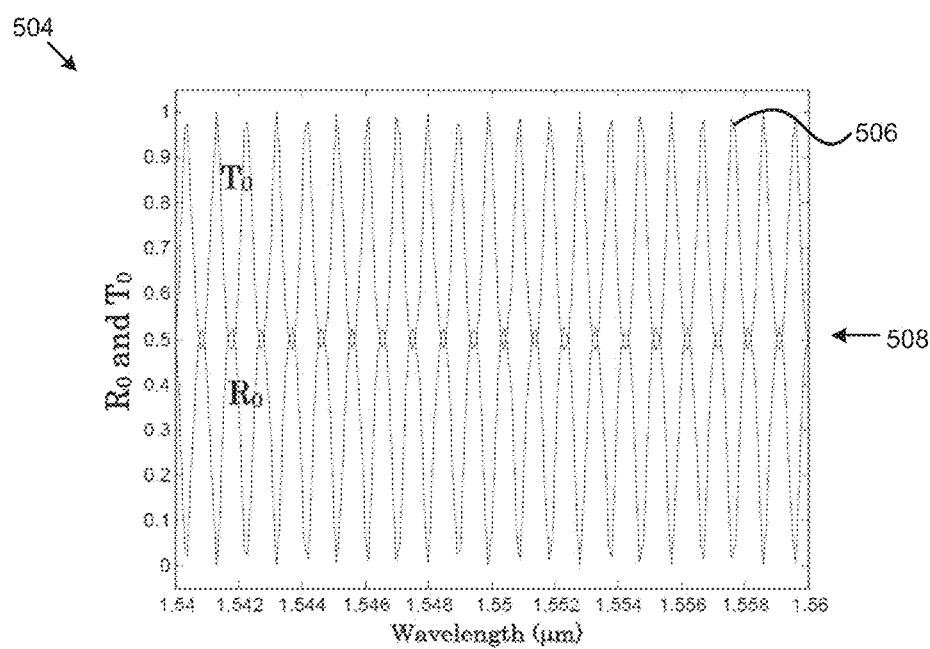
FIG. 5B is the spectrum of a comparable Fabry-Perot slab that is 500 µm thick with n=2.5 under normal incidence.

A comparable Fabry-Perot (FP) slab resonator has a spectral density of the same order of magnitude. An FP resonator has $T_0=1$ guaranteed at frequencies $v_q=qc/2nd$ where q is an integer and c is the speed of light in vacuum. For d=500 μm, n=2.5, there are 21 transmission peaks 506 in the 1.54-1.56 μm spectral range but with sidebands 508 at the ~50% level as shown in the graph 504 of FIG. 5B.

Figure 6:
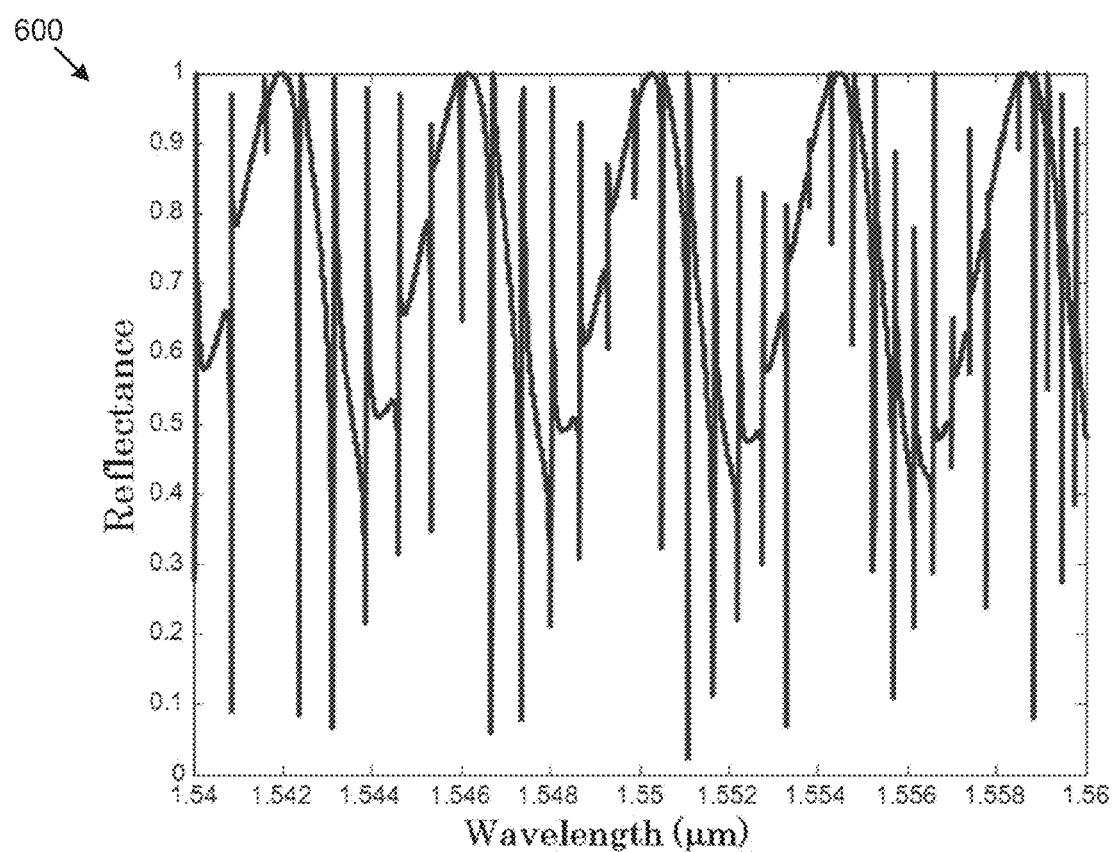
FIG. 6 is the same as FIG. 3 but with $\Lambda$=1250 nm thus admitting the m=±2 diffraction orders.

To aid in the design and understanding of these devices, one may consider the effects of admitting additional diffraction orders into the structure. For example, for $\Lambda \geq 2?\lambda/n$, the m=±2 orders exist in the device in addition to the m=±1 orders. In contrast to the results in FIGS. 3-5, the resonant modes excited by these orders do not exist in harmony and their interference causes somewhat chaotic spectral signatures 600 as shown in FIG. 6. The mode angles for these two diffraction orders at λ=1.55 μm for this period are $\theta_2 \sim 30°$ and $\theta_1 \sim 83°$. The parameters are the same as in FIG. 3 but with Λ=1250 nm, thus admitting the m=±2 diffraction orders.

The additional examples presented below disclose additional embodiments that provide particular spectral responses. These spectral responses were modeled with the computational methods described above.

Example 1

Figure 7A:
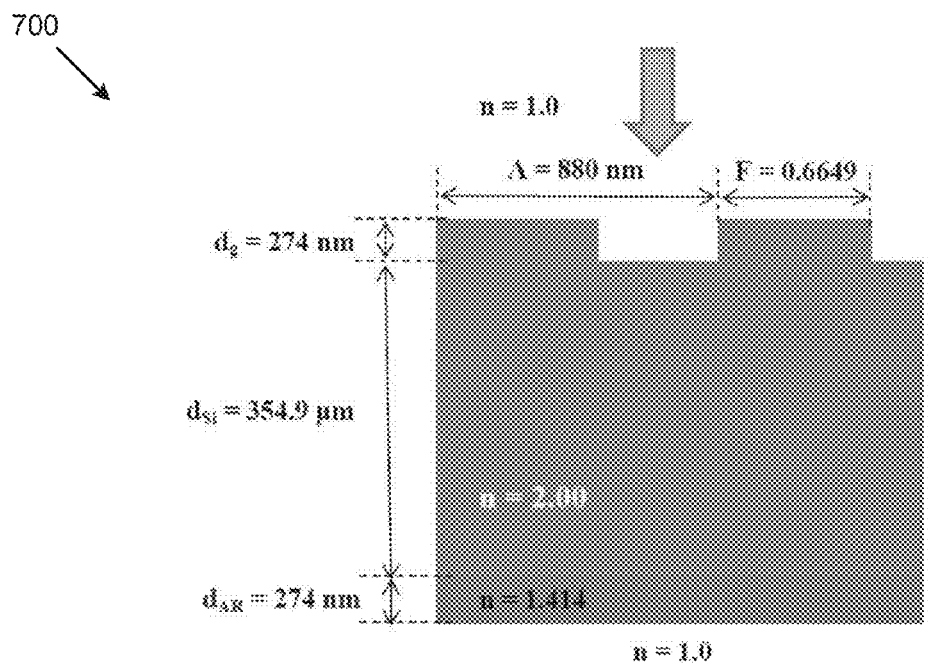
FIGS. 7A-B show the Particle Swarm Optimization ("PSO") results to match a part of the ITU grid.

This example emphasizes telecommunications filtering applications. A subset of the C-band with 100 GHz channel spacing fits a comb spectrum with 10 resonance wavelengths matching the ITU grid, namely this set: 1553.33, 1552.52, 1551.72, 1550.92, 1550.12, 1549.32, 1548.51, 1547.72, 1546.92, 1546.12, all in nm. This design was modeled using the PSO design algorithm. FIG. 7A illustrates a resulting dielectric structure with design parameters (using the same dimension references used in connection with FIG. 1): $d_g$=274 nm, d=354.9 μm, $d_{AR}$=274 nm, n=2.00, $n_c$=1.00, $n_s$=1.00; $n_{AR}$=1.414, grating period Λ=880 nm; fill factor F=0.6649.

Figure 7B:
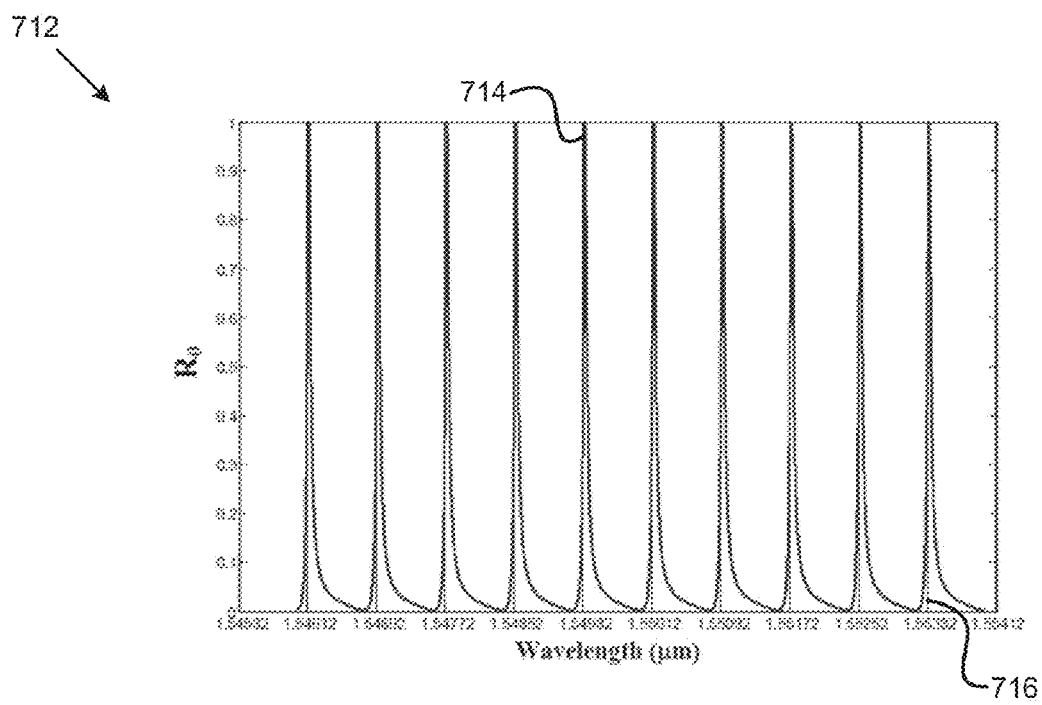

FIG. 7B shows a corresponding GMR comb-like reflectance spectrum 712 of the filter described in connection with FIG. 7A. ITU wavelengths are denoted by vertical dashed lines 716, which are fitted by the reflectance peaks 714. Again, this is a dielectric membrane in air with an AR layer fashioned with typical dielectric media.

Example 2

Figure 8A:
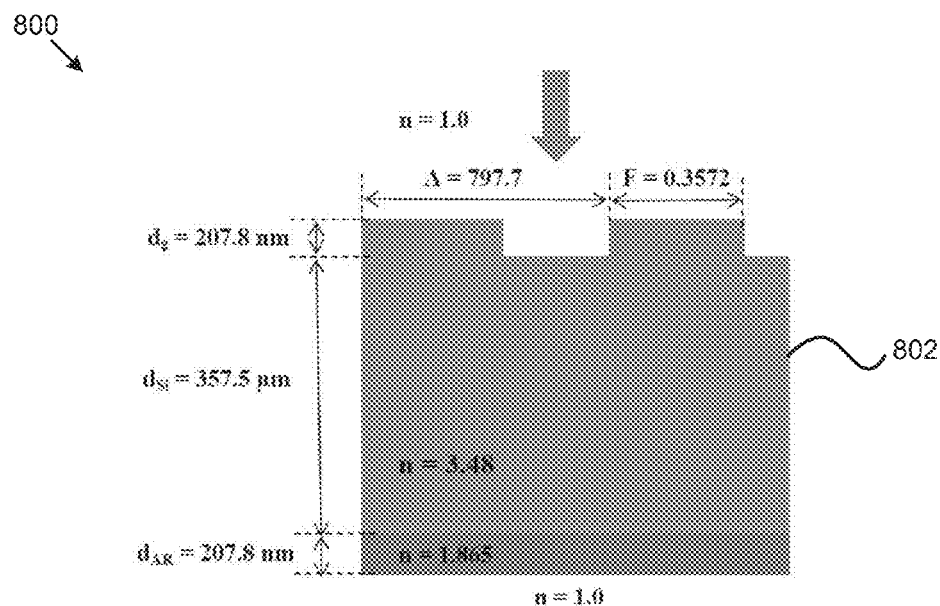
FIGS. 8A-8B show PSO simulation results to match a part of the ITU grid.
Figure 8B:
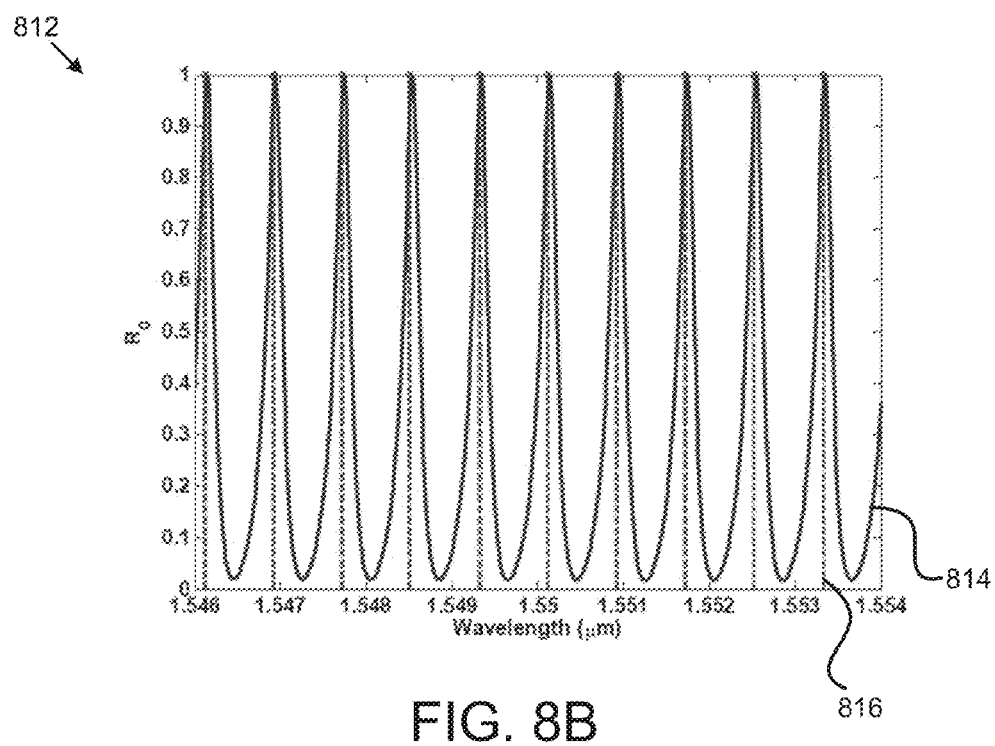

FIGS. 8A-B provide an example of a comb-like filter 800 using different parameters. In this example, the design parameters are: $d_g$=207.8 nm, d=357.5 μm, $d_{AR}$=207.8 nm, n=3.48, $n_c$=1.00, $n_s$=1.00; $n_{AR}$=1.865, grating period Λ=797.7 nm; and fill factor F=0.3572. The film 802 is made of a semiconductor (Si).

FIG. 8B shows the GMR comb-like reflectance spectrum 812 for the device shown in FIG. 8A. The ITU wavelengths are denoted by dashed vertical lines 816 and the reflectance of the filter 800 are denoted by the waveform 814.

Example 3

Figure 9A:
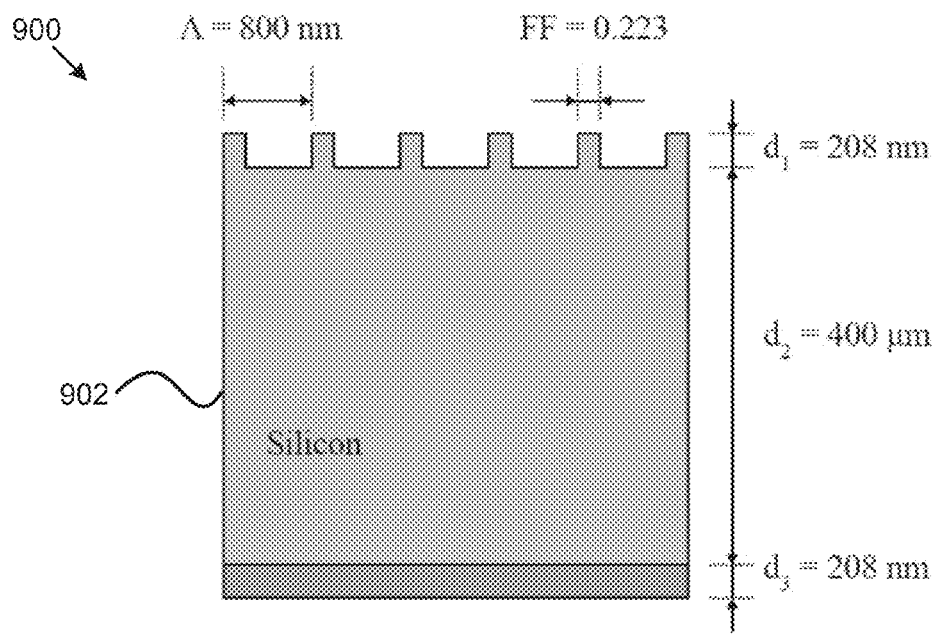
FIG. 9A shows the silicon structure and design parameters for a GMR comb-like filter.
Figure 9B:
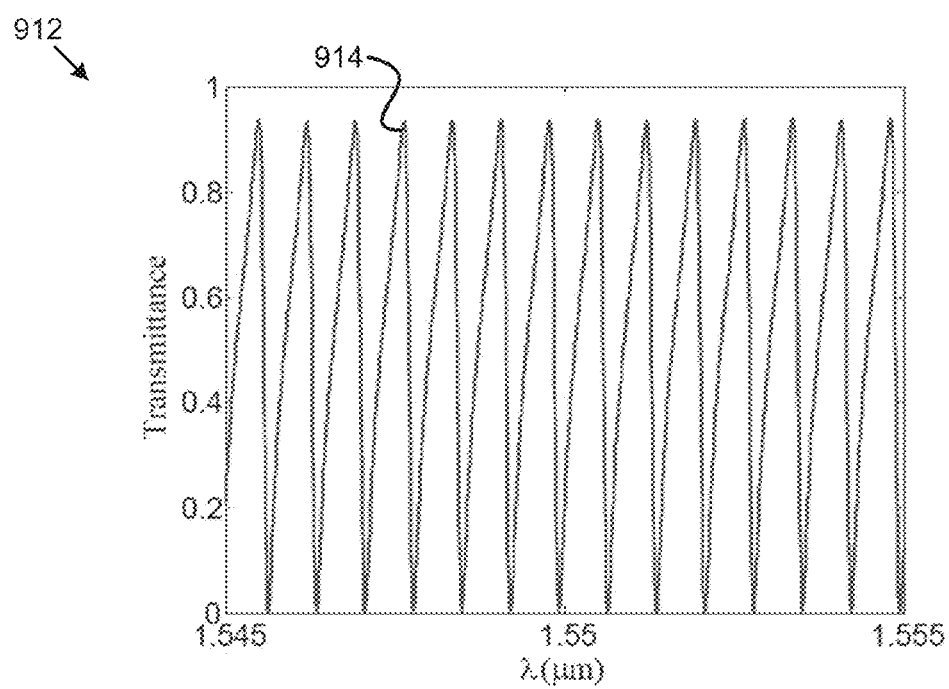
FIG. 9B shows the computed transmission ($T_0$) spectrum corresponding to the parameters in FIG. 9A.

FIGS. 9A-B provide an example of a comb-like filter 900 using different parameters. In this example, the design parameters are: $d_g$=208 nm, d=400 μm, $d_{AR}$=208 nm, n=3.48 (silicon), $n_c$=1.00, $n_s$=1.00; grating period Λ=800 nm; and fill factor F=0.223. The film 902 is made of a semiconductor (Si).

FIG. 9B provides the computed transmission ($T_0$) spectrum 912 corresponding to the design described in connection with FIG. 9A. The transmission spectrum includes peaks 914 in a comb-like fashion.

The flow chart diagrams that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. For example, in some embodiments, silicon is used for the film while in others titanium oxide is used. All such similar substitutes and modifications apparent to those skilled in the art are deemed to be within the spirit, scope, and concept of the invention as defined by the appended claims.

Figure 10:
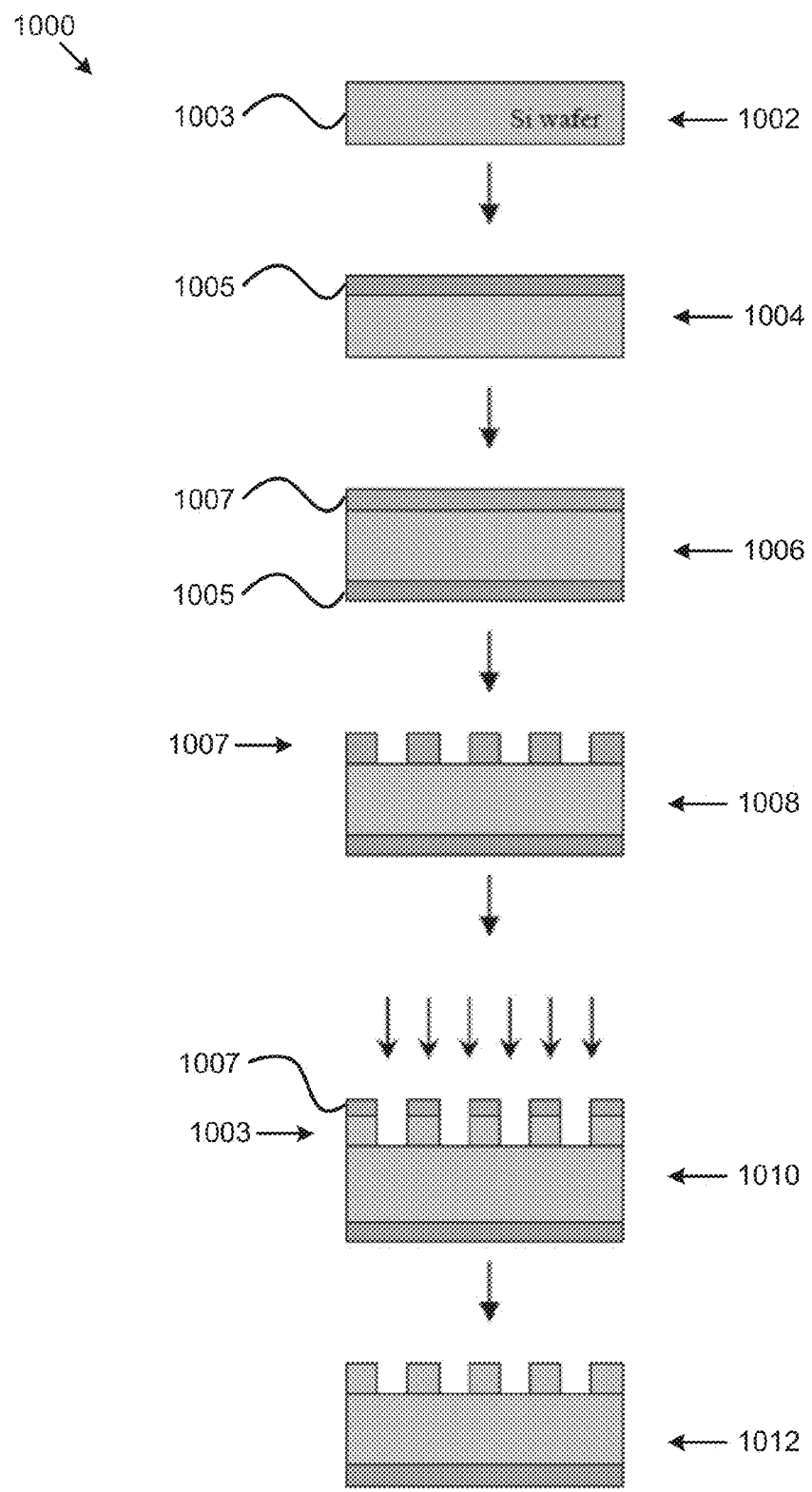
FIG. 10. Shows a fabrication process for a GMR comb-like filter.

FIG. 10 shows the results of a method 1000 that may be used in the fabrication process of the disclosed filters. In this example the first step 1002 begins with a silicon wafer 1003. However, in some embodiments, other materials may be used to create the film of the GMR filter. In step 1004 an antireflective layer 1005 is deposited or formed on the silicon. In step 1006, the wafer is turned upside down and a masking material 1007 is deposited on the silicon. At step 1008, the deposited masking material 1007 may be formed (e.g. using photolithography or holographic interferometry). At step 1010 the silicon 1003 may be etched, which leaves a periodic pattern in the silicon. At step 1012, the masking material (1007 in step 1010) may be removed, leaving the GMR filter.

Figure 11A:
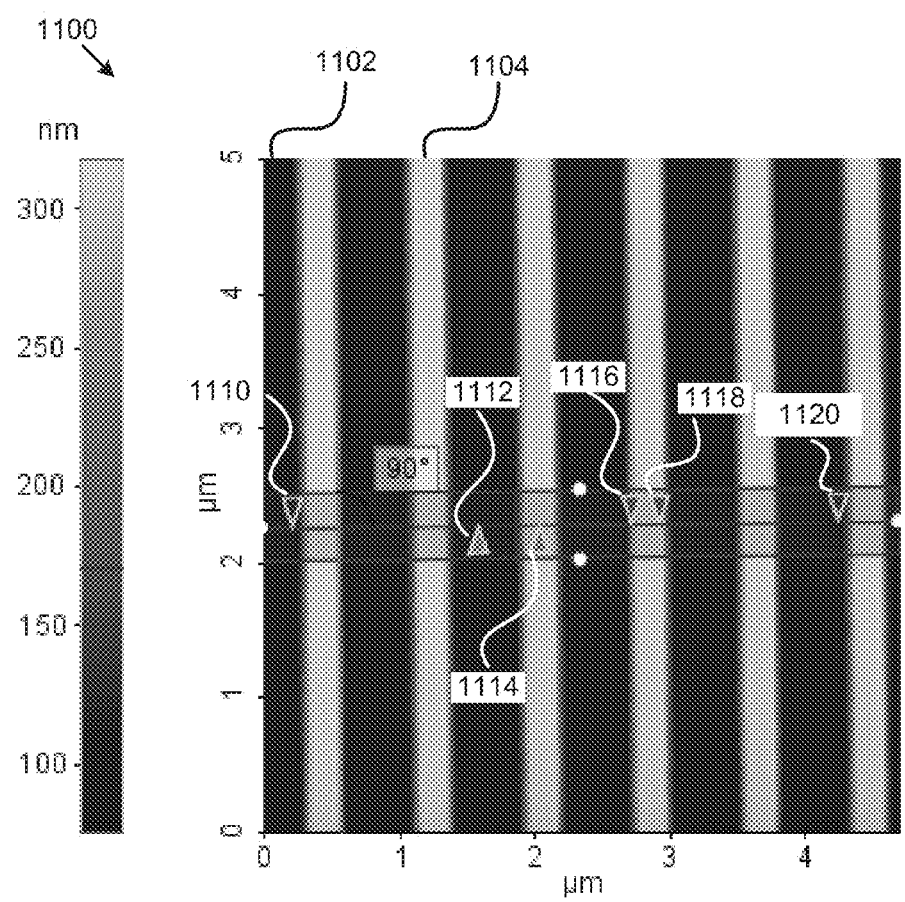
FIGS. 11A and 11C shows Atomic Force Microcopy (AFM) images of the fabricated GMR comb grating and parameters.
Figure 11B:
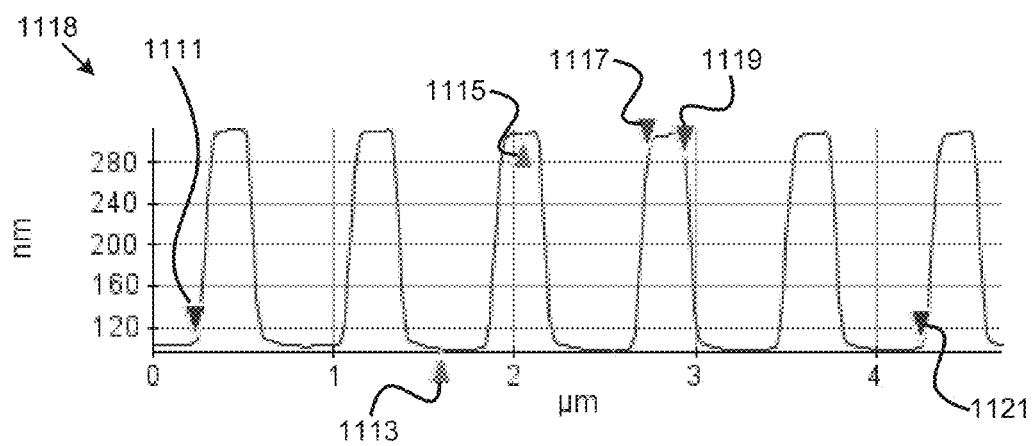
FIG. 11B shows a graphical representation of the profile of the imaged GMR comb grating.
Figure 11C:
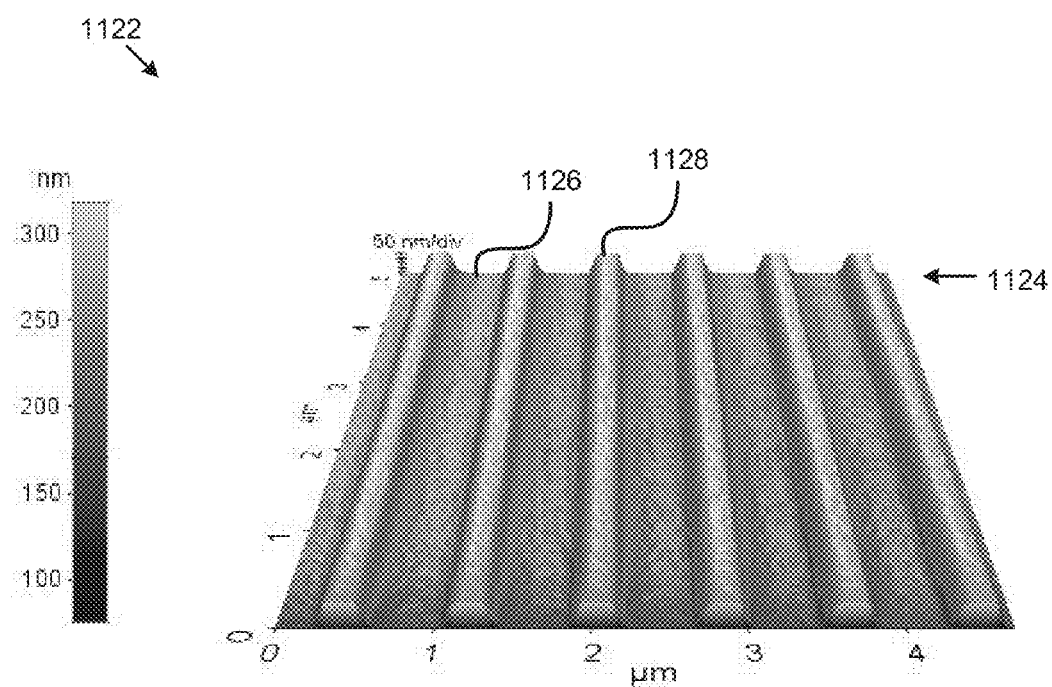

FIGS. 11A-C show the verification and inspection of a fabricated GMR comb grating via Atomic Force Microcopy (AFM). FIG. 11A shows a top view 1100 of the grating having grooves 1102 and ridges 1104. The graph 1118 in FIG. 11B shows the height profile of the grating in FIG. 11B. For fexample the point 1110 in FIG. 11A corresponds to the point 1111 in FIG. 11B. Point 1114 in FIG. 11A corresponds to the high point in the fill and point 1115 in FIG. 11B. Points 1116 and 1118 in FIG. 11A (and corresponding points 1117 and 1119, respectively, in FIG. 11B) show the square profile of the fills. Almost the entire length of a fill 1104 is above 280 nm on the relative scale in FIG. 11B. Finally point 1120 in FIG. 11A (and point 1121 in FIG. 11B) shows the square profile of the grooves 1102. Almost the entire groove is below the 120 nm mark on the relative scale in FIG. 11B. From this AFM data of this example, the grating period is found to be 802.8 nm, the fill factor is 0.258 and the depth of the grating (or height of the ridges) is 209 nm.

FIG. 11C shows a picture 1122 of a grating having grooves 126 and fills 1128 that make up a periodic layer 1124.

Figure 12A:
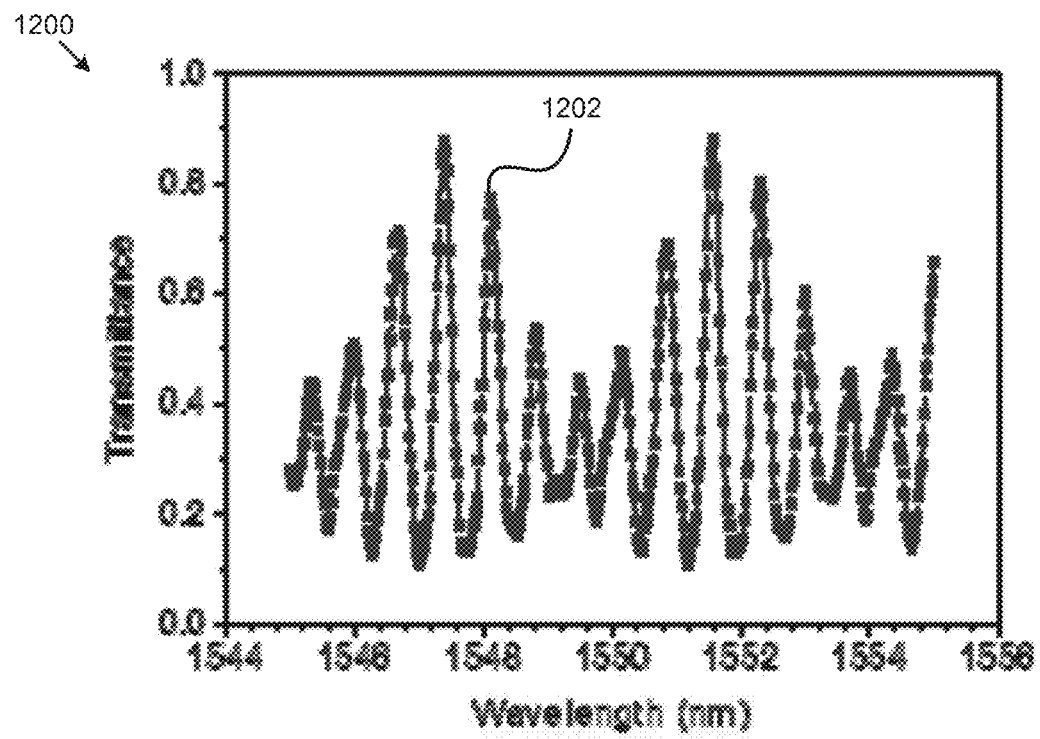
FIGS. 12A-B show experimental GMR comb-like filter results.
Figure 12B:
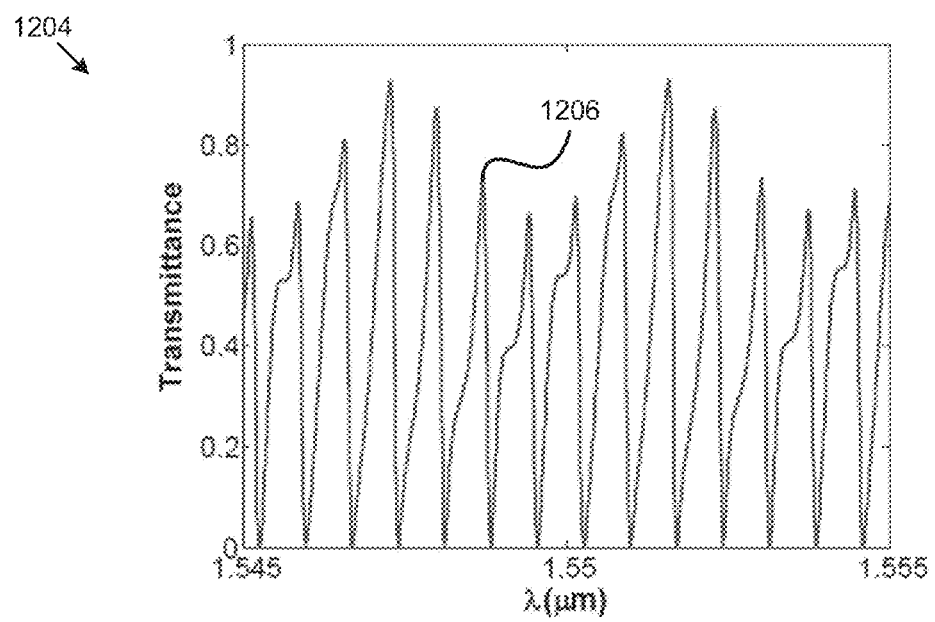
Figure 13:
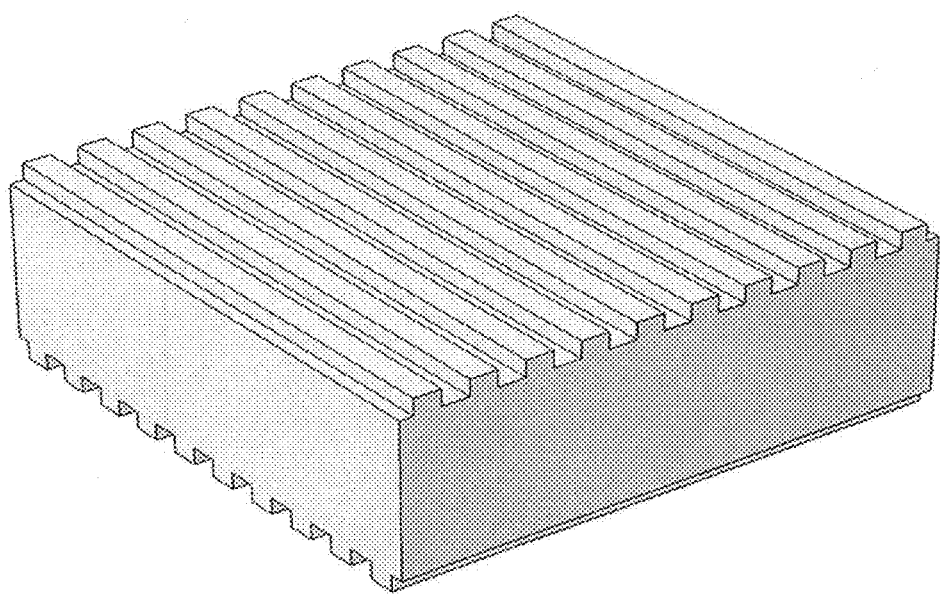
FIG. 13 shows one embodiment of a GMR filter.

FIG. 12A shows the measured experimental $T_0$ spectrum in the 1544-1556 nm wavelength band for the GMR comb-like filter modeled in FIG. 9A and whose fabricated grating is shown in FIG. 11A. FIG. 12B shows computed results using the experimental parameters in the simulation. There is good qualitative agreement in spectral density and linewidths of the individual resonance lines 1202 in FIG. 12A and 1206 in FIG. 12B. The major reason for the difference between theoretical and experimental results is due to an AR layer thickness that is too large in this specific implementation.

Applications

The spectral properties of thick GMR comb-like filters presented herein may have utility in practical applications. Well-shaped, regular zero-order reflectance spectra with reasonable linewidths and sideband levels can be achieved. Multichannel band-stop filters are used in optical communications for multiplexing and demultiplexing functions. In such applications, the sideband levels and associated degree of channel isolation are important considerations. Simulations show that the comb-like spectra generated by the thick filters presented herein can be fitted to the International Telecommunication Union (ITU) grid (e.g. 10 channels or more). One approach to this task is to specify the ITU wavelength set to be used and apply inverse numerical methods to find experimentally realizable structures within a constrained parametric space as discussed herein. A commonly-used design algorithm is based on particle swarm optimization. Hence, it is possible to filter out certain telecommunication channels while allowing others to pass. Another possible use is the sampling of frequency comb spectra. Such frequency combs can be generated, for example, by mode-locked femtosecond lasers or by certain microresonator designs including ring resonators. The disclosed comb-like filters may be applicable to filter out, or select, a subset of frequency comb lines.

Fabrication

Leaky-mode resonance elements can be fabricated using a variety of methods and materials. New methods in fabrication are not needed to fabricate the devices subject to this disclosure. Device patterning can be conducted with conventional photolithography, nanoimprint lithography, electron-beam lithography, and laser holographic interference lithography. Standard etching and thin-film deposition processes are applicable in the fabrication steps. Etching and pattern transfer can be performed using reactive-ion etching (RIE), such as for shallow gratings, and DRIE, for deep gratings. Inspection by scanning electron microscopy (SEM) and AFM can be used for assessment of the processed devices. Optical spectral characterization can be done with tunable lasers, wide-band supercontinuum sources, and matched spectrum analyzers. Fast pulse lasers, wide-bandwidth oscilloscopes, and sensitive detectors can be applicable for testing the devices. The fabrication process of the example experimental GMR comb-like filter provided in this disclosure is shown in FIG. 10 with pertinent AFM inspection results shown in FIG. 11.

What is claimed is:

1. A guided-mode resonance (GMR) filter comprising:
a film having a first surface and a second surface opposite to the first surface;
a periodic pattern on the first surface of the film having a period;
the film having a thickness that is at least five times larger than the size of the period; and
an antireflection layer on the second surface of the film;
where the guided-mode resonance filter exhibits multiple ordered spectral resonance peaks.

2. The GMR filter of claim 1, where the wavelength of operation is in the telecommunications C band.

3. The GMR filter of claim 1, where the thickness is between about 5 μm and 1500 μm.

4. The GMR filter of claim 1, where the thickness is between about 100 μm and 500 μm.

5. The GMR filter of claim 1, where the periodic pattern has a period sufficiently small such that diffraction orders outside the device are cut off.

6. The GMR filter of claim 1, where the filter is configured to reflect light as a comb-like filter.

7. The GMR filter of claim 6, where the comb-like filter is configured to be fitted to an ITU grid.

8. The GMR filter of claim 1, where the periodic pattern is in an antireflective layer coupled to the film.

9. The GMR filter of claim 1, where the periodic pattern is inscribed in the film.

10. The GMR filter of claim 1, further comprising a second periodic layer on the second surface of the film.

11. The GMR filter of claim 10, where the periodic pattern is orthogonal to the second periodic layer.

12. The GMR filter of claim 1, where the periodic pattern exhibits one-dimensional periodicity.

13. The GMR filter of claim 1, where the periodic pattern exhibits two-dimensional periodicity.

14. The GMR filter of claim 1 where said periodic layer has profiles selected from a group consisting of a binary profile, rectangular profile, trapezoidal profile, sinusoidal profile, triangular profile, and combinations thereof.

15. The GMR filter of claim 1, where the film comprises a dielectric.

16. The GMR filter of claim 1, where the film comprises a semiconductor.

17. A method for filtering light comprising:
receiving, at a first surface of a guided-mode resonant filter, incident light; and
causing the incident light to be filtered in a periodic comb-like fashion;
where the guided-mode resonant filter comprises:
a film having a first surface and a second surface opposite to the first surface;
a periodic pattern on the first surface of the film having a period;
the film having a thickness that is at least five times larger than the size of the period; and
an antireflection layer on the second surface of the film;
where the guided-mode resonance filter exhibits multiple ordered spectral resonance peaks.

18. The method of claim 17, where the periodic pattern has a period sufficiently small such that diffraction orders outside the device are cut off.

19. The method of claim 17, where the guided mode resonant filter is configured to be fitted to an ITU grid.

20. A method for making a guided mode resonant filter, comprising:
- providing a film having a first surface and a second surface opposite to the first surface;
- disposing a periodic pattern having a period on the first surface of the film, where the film has a thickness that is at least five times larger than the size of the period; and
- disposing an antireflection layer on the second surface of the film;
- where the guided-mode resonance filter exhibits multiple ordered spectral resonance peaks.

* * * * *